(12) United States Patent
Shimizu

(10) Patent No.: US 10,142,588 B2
(45) Date of Patent: Nov. 27, 2018

(54) INFORMATION-PROCESSING DEVICE, COMMUNICATION SYSTEM, STORAGE MEDIUM, AND COMMUNICATION METHOD

(71) Applicant: NINTENDO CO., LTD., Kyoto (JP)

(72) Inventor: Takao Shimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 139 days.

(21) Appl. No.: 14/557,992

(22) Filed: Dec. 2, 2014

(65) Prior Publication Data

US 2016/0006772 A1   Jan. 7, 2016

(30) Foreign Application Priority Data

Jul. 7, 2014   (JP) .................. 2014-139576

(51) Int. Cl.
*H04N 7/14* (2006.01)
*H04L 12/18* (2006.01)
*H04N 7/15* (2006.01)

(52) U.S. Cl.
CPC ......... *H04N 7/147* (2013.01); *H04L 12/1813* (2013.01); *H04L 12/1827* (2013.01); *H04N 7/157* (2013.01)

(58) Field of Classification Search
CPC .................................................. H04N 7/157
USPC ........................................................ 709/204
See application file for complete search history.

(56) References Cited

U.S. PATENT DOCUMENTS

| | | | |
|---|---|---|---|
| 2004/0201667 A1 | 10/2004 | Hasegawa | |
| 2007/0268312 A1* | 11/2007 | Marks | A63F 13/06 345/633 |
| 2008/0069323 A1* | 3/2008 | Walter | H04M 15/00 379/111 |
| 2008/0192736 A1* | 8/2008 | Jabri | G11B 27/034 370/352 |
| 2009/0122130 A1 | 5/2009 | Tsukada | |
| 2013/0258040 A1* | 10/2013 | Kaytaz | H04N 7/157 348/14.07 |
| 2014/0176662 A1* | 6/2014 | Goodman | H04N 7/141 348/14.07 |
| 2014/0267542 A1 | 9/2014 | Nakamura | |
| 2014/0267544 A1* | 9/2014 | Li | H04M 1/72544 348/14.02 |

FOREIGN PATENT DOCUMENTS

| | | |
|---|---|---|
| JP | 2002-125208 | 4/2002 |
| JP | 2003-37826 | 2/2003 |

(Continued)

OTHER PUBLICATIONS

JP Notification of Refusal dated Sep. 11, 2018, issued in JP 2014-139576 (3 pages).

*Primary Examiner* — Kevin S Mai
(74) *Attorney, Agent, or Firm* — Nixon & Vanderhye PC

(57) ABSTRACT

An example information-processing device includes: an acquiring unit that acquires a captured image of a first user captured by an image capture unit; a determining unit that determines a character image corresponding to the acquired captured image; and a display control unit that controls display of an image locally and remotely at a corresponding communicating information-processing device used by a second user, either as a captured image or a as a character image.

25 Claims, 3 Drawing Sheets

(56) References Cited

FOREIGN PATENT DOCUMENTS

| | | |
|---|---|---|
| JP | 2004-312634 | 11/2004 |
| JP | 2006-140871 | 6/2006 |
| JP | 2008-107942 | 5/2008 |
| JP | 2013-110472 | 6/2013 |
| WO | WO 2006/120840 | 11/2006 |

\* cited by examiner

INFORMATION-PROCESSING DEVICE, COMMUNICATION SYSTEM, STORAGE MEDIUM, AND COMMUNICATION METHOD

CROSS REFERENCE TO RELATED APPLICATIONS

The disclosure of Japanese Patent Application No. 2014-139576, filed on Jul. 7, 2014, is incorporated herein by reference.

FIELD

The technique described herein relates to a display of images during communication between users such as in a chat session.

BACKGROUND AND SUMMARY

There is known in the art a technique for switching an image to be displayed between an image of a user captured by a camera and an avatar image of the user in a videophone system.

According to one aspect of the technique, there is provided an information-processing device, comprising: an acquiring unit that acquires a captured image of a first user, captured by an image capture unit; a determining unit that determines a character image corresponding to the acquired captured image; and a display control unit that controls display of an image locally and remotely at a corresponding communicating information-processing device used by a second user, either as a captured image or a as a character image.

DETAILED DESCRIPTION OF NON-LIMITING EXEMPLARY EMBODIMENTS

1. Exemplary Embodiment

Figure 1:
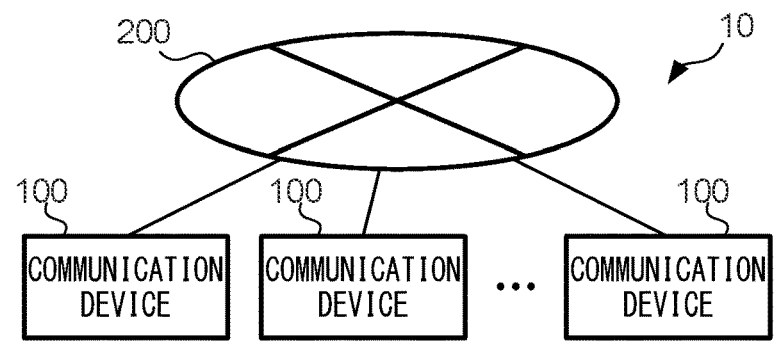
FIG. 1 shows an example of a configuration of a communication system.

FIG. 1 is a block diagram illustrating a configuration of communication system 10, which is an exemplary embodiment according to the present technique.

Communication system 10 is an information-processing system for conducting communication with users by using communication device 100. In the present exemplary embodiment, communication is exchanging of information by using texts, images, voices, and so on.

Communication system 10 includes plural communication devices 100, which are connected to one another via network 200. Communication device 100 is an information-processing device having a communication function. Communication device 100 may be a personal computer, a home-use or a portable gaming console, a smartphone, or a tablet computer. However, a specific configuration of communication device 100 is not limited thereto. In addition, communication device 100 may be shared with pre-registered plural users such as a family. Network 200 is a communication network such as the Internet, a mobile communication network, or a wireless LAN (Local Area Network). Network 200 is not limited to one of these networks. The communication network herein may be a NFC (Near Field Communication) network such as a PAN (Personal Area Network), and communication is not necessarily relayed by other devices. Communication system 10 may include a server device for intermediating communication and executing certain processes.

Figure 2:
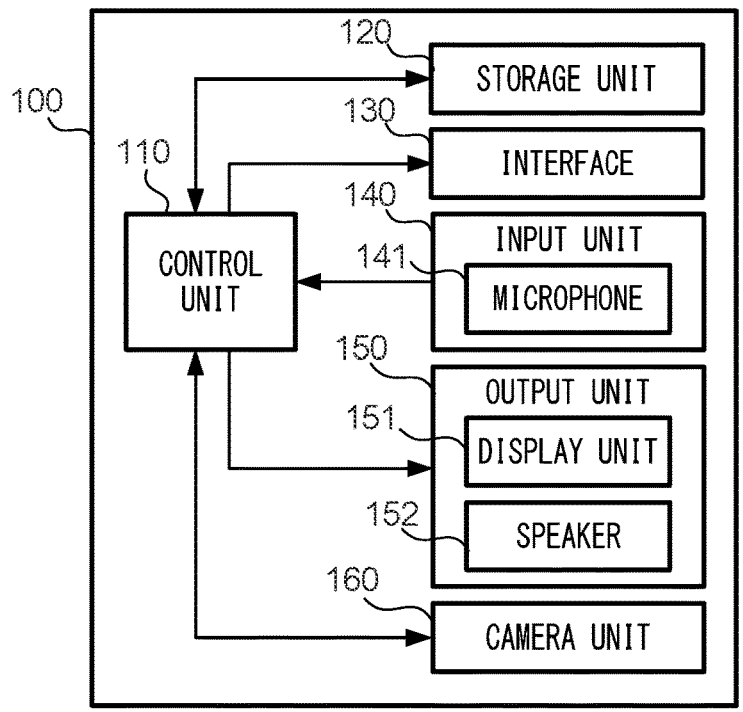
FIG. 2 shows an example of a hardware configuration of a communication device.

FIG. 2 is a block diagram illustrating a hardware configuration of communication device 100. Communication device 100 includes control unit 110, storage unit 120, interface 130, input unit 140, output unit 150, and camera unit 160. Input unit 140 further includes microphone 141. Moreover, output unit 150 includes display unit 151 and speaker 152.

Control unit 110 is a unit for controlling activity of communication device 100. Specifically, control unit 110 includes a processor such as a CPU (Central Processing Unit) and a main memory, and executes programs to control operations of components of communication device 100. In the present exemplary embodiment, the programs may include an application program for performing a chat with other communication devices 100 (hereinafter referred as a "chat program") and an application program for identifying a user by using facial recognition technology. Facial recognition technology used in the present exemplary embodiment may recognize a face of a user based on characteristics of the user's face such as a shape or positional relation of a facial contour, eyes, nose, mouth, ears, and others. For example, control unit 110 may be configured to store feature points of a user's face, and to recognize the user's face based on a positional relation of one or more such feature. However, facial recognition technology used in the present embodiment is not thus limited.

It is noted that control unit 110 may include plural processors capable of executing functions in co-operation with each other. For example, control unit 110 may include two processors, one of which controls display of images and the other of which controls communication with an external device.

Storage unit 120 is a unit for storing data. Specifically, storage unit 120 includes a storage medium such as a hard disk, and stores data, for example a program, for execution by control unit 110. In the present exemplary embodiment, storage unit 120 stores image data indicative of an avatar image of a user registered in communication device 100. Hereinafter, such data will be referred to as "avatar data." In the present exemplary embodiment, only one type of avatar data is assigned to each user.

An avatar image herein is an image indicative of a specific user. Typically, the avatar image reflects physical characteristics (such as a face or a hairstyle) of a specific user that other users associate with the user. The avatar image is an example of a "character image" in the present technique.

Interface 130 is a unit for exchanging data. Specifically, interface 130 exchanges data with each of other communication devices 100 via network 200. Interface 130 may communicate with other communication devices 100 by wired or wireless communication.

Input unit 140 is a unit for inputting data. Particularly, microphone 141 is a unit for collecting sound. Input unit 140 inputs data generated by an action of the user such as an input operation or an utterance. Input unit 140 may include plural keys as in a keyboard or a keypad, and a pointing device such as a mouse. In addition, input unit 140 may include an acceleration sensor and a gyroscope for detection of a movement of the user. Hereinafter, data input by input unit 140 will be referred to as "input data." Input data may include audio data.

Output unit 150 is a unit for outputting data. Display unit 151 is a unit for outputting data as an image. More specifically, display unit 151 includes a display such as a LCD (Liquid Crystal Display) or an OLED (Organic Light Emitting Display). Speaker 152 is a unit for outputting data as audio. Display unit 151 may include a touchscreen display, and also function as a part of input unit 140.

Microphone 141 and speaker 152 can be configured to be separate from communication device 100, such as in a case of a headset. In this case, input unit 140 and output unit 150 include an interface to the headset such as an input-output terminal or a NFC (Near Field Communication) interface.

Camera unit 160 is a unit for capturing an image. Specifically, camera unit 160 includes an image sensor such as a CCD (Charge Coupled Device) image sensor, and generates image data. The image in the present exemplary embodiment is typically of a user of communication device 100, and more typically of a face of the user. Accordingly, camera unit 160 preferably is located at a position from it can capture the face of the user by way of communication device 100 (more specifically, user viewing display unit 151); for example, at a position that is in the vicinity of display unit 151.

The foregoing is a description of a configuration of communication system 10. By this configuration, a user can chat with another user by using communication system 10. Users can use texts and/or voice in a chat. In addition, a chat in the present exemplary embodiment may include a video chat, namely, a chat in which a video image is displayed. Communication device 100 can perform video chat by recording images of the user by way of camera unit 160. In a video chat sounds and images can be exchanged essentially in real time. Video chat is one example of "real-time communication" of the present technique.

When starting a chat, the user (caller) specifies a destination user (addressee) and performs a specific operation at a designated communication device 100 to request a communication device 100 of the addressee to enter a chat. Hereinafter, such a request will be referred to as a "communication request." The communication request includes information that identifies the caller and the addressee (such as an ID or a username).

In the present exemplary embodiment, a sole addressee is determined at upon initiation of a chat at the designated communication device 100. However, the designated communication device 100 may be utilized by plural users. Thus, when communication device 100 receives an incoming call from the caller, a user of communication device 100 need not necessarily be a sole addressee.

In the present exemplary embodiment, communication device 100 requires a login (user authentication) upon use. For example, the user performs login when starting use of communication device 100. Communication device 100 can identify the user and determine whether s/he is the addressee of the chat. Communication device 100 may capture an image of the user and identify the user by use of facial recognition technology when logging in. Alternatively, communication device 100 may make use of another biometric authentication such as a fingerprint authentication or a vein authentication, or require an ID and password of the user.

Identification of the user by communication device 100 may be continuously verified until the user answers an incoming call for a chat. Therefore, a timing of identification is not limited to a timing of login. For example, communication device 100 may identify the user by accepting a login when a chat program is first started.

In the present exemplary embodiment, the user can participate in a video chat by using a captured image or an avatar image. For example, in a case that the user does not wish a communicant to be able to view him/her or his/her surroundings (for example, when his/her room is untidy or his/her appearance is not satisfactory), s/he can use the avatar image as a substitute for the captured image. In the present exemplary embodiment, normally the user principally uses the captured image, but may if desired uses the avatar image in place of the captured image.

Communication device 100 determines the avatar image used for use in a video chat based on the captured image. For example, communication device 100 can capture and recognize a face of the user when logging in, and use an avatar image indicative of the recognized face.

Figure 3:
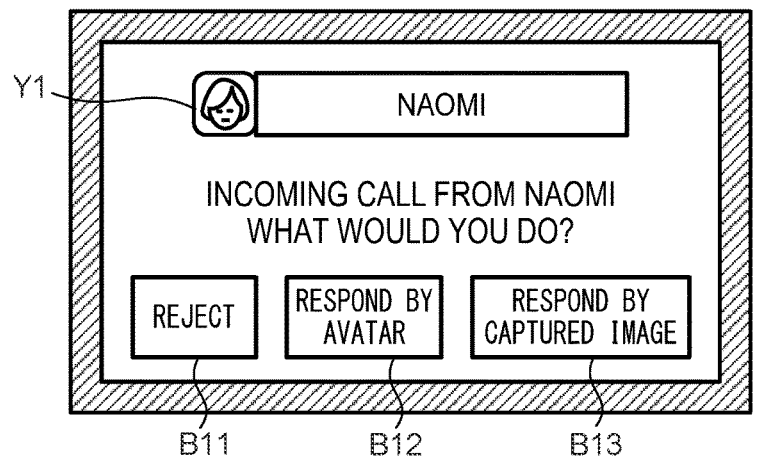
FIG. 3 shows an example of an incoming call screen.

FIG. 3 is an example of an incoming call screen displayed by display unit 151 upon start of a chat. Upon receipt of the communication request during use by the user, communication device 100 pops up an incoming call screen. The incoming call screen includes an image Y1 indicative of the caller (namely, the other party participating in the chat), and also includes buttons B11, B12, and B13 for receiving operations input by the user.

Specifically, image Y1 is an image indicative of a captured image and a name of the caller; alternatively image Y1 may be an image indicative of either the avatar image or the name of the caller, or of the captured image of the caller in place of the avatar image. Buttons B11, B12, and B13 are buttons for selecting a manner of handling an incoming call. Button B11 is selected when the user decides to reject an incoming call. Button B12 is selected when the user answers an incoming call by use of an avatar image. Button B13 is selected when the user answers an incoming call by use of a captured image.

Figure 4:
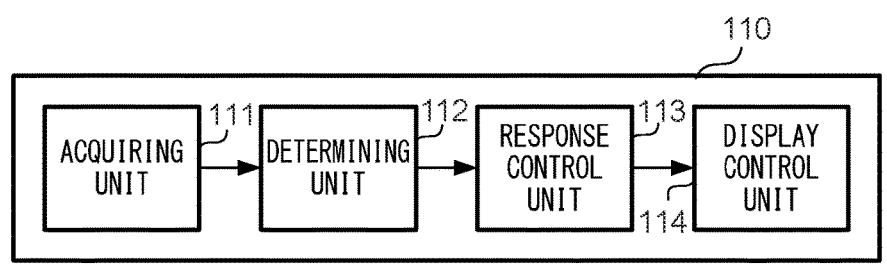
FIG. 4 shows an example of a functional configuration of the communication device.

FIG. 4 is a block diagram showing a functional configuration of communication device 100. Particularly, FIG. 4 is illustrative of a functional configuration for display control in a chat. Communication device 100 can realize functions of acquiring unit 111, determining unit 112, response control unit 113, and display control unit 114 upon execution of a chat program.

Acquiring unit 111 is a unit for acquiring a captured image. Acquiring unit 111 acquires image data from camera unit 160. The acquired image data (hereinafter referred as "captured data") represents a captured image of the user. Acquiring unit 111 can acquire an image from camera unit 160 before, during or after start of an incoming call. Camera unit 160 accordingly captures image data depending on a request received from acquiring unit 111.

Determining unit 112 is a unit for determining an avatar image used in a chat. Determining unit 112 determines the avatar image according to the captured image based on the captured data. For example, determining unit 112 can recognize a face of a user included in the captured image by using facial recognition technology, and thereby determine avatar data indicative of the recognized face. An ID may be assigned to at least one of the recognized face and corresponding avatar data.

Response control unit 113 is a unit for controlling a response to an incoming chat call. Response control unit 113 determines whether to respond to an incoming call from a corresponding communication device 100 based on an operation of a user. In addition, response control unit 113 can change a manner of response depending on whether the communicating user is the addressee or not. For example, when the communicating user is the addressee, response control unit 113 enables the user to either respond to or reject an incoming call. In a case that the user is not the addressee, response control unit 113 executes a predetermined process without starting a chat.

Display control unit 114 is a unit for controlling display of images. Display control unit 114 controls display of images on its own device and also on a corresponding communication device 100 of the caller. When responding to an incoming call, display control unit 114 displays either the avatar image or the captured image on the corresponding communication device 100 by transmitting either the captured data or the avatar data to the corresponding communication device 100. Similarly, display control unit 114 receives either the captured data or the avatar data from the corresponding communication device 100 and displays the image according to the received data on its own device.

Figure 5:
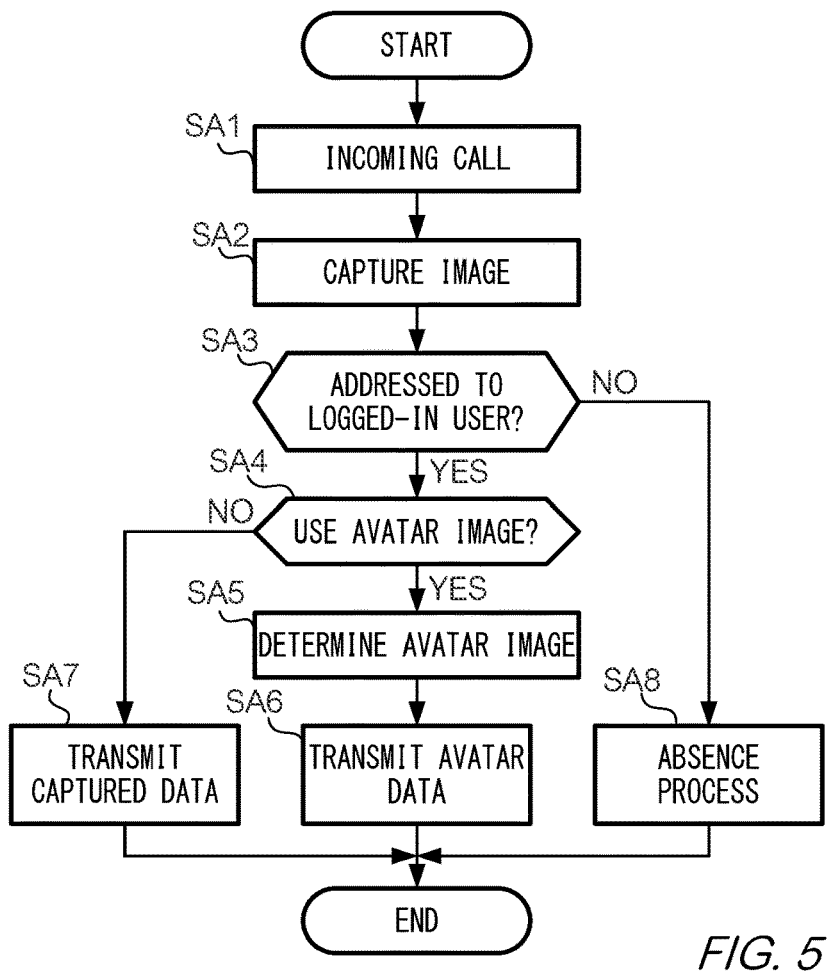
FIG. 5 shows an example of a flowchart illustrating a process executed by the communication device.

FIG. 5 is a flowchart illustrating a main process executed by communication device 100 when receiving an incoming call for a chat. Firstly, control unit 110 of communication device 100 detects an incoming call for a chat (step SA1). Specifically, control unit 110 detects a communication request transmitted from communication device of the caller. The incoming call occurs as interrupt processing.

After detecting the incoming call, control unit 110 causes camera unit 160 to commence image capture (step SA2). Namely, control unit 110 uses the incoming call as a trigger to initiate imaging capture of camera unit 160. Control unit 110 may operate camera unit 160 before detecting an incoming call; or camera unit 160 may continue to provide captured data for control unit 110 until control unit 110 finishes the process shown in FIG. 5.

Subsequently, control unit 110 determines whether the communicating user (namely, the logged-in user) is the addressee of the incoming call (step SA3). In a case that the logged-in user is not the addressee (step SA3; NO), control unit 110 executes a predetermined process (hereinafter referred as an "absence process") at step SA8. For example, the absence process is a process in which communication device 100 of the caller is prompted to output a predetermined voice or text message indicative of an absence of the addressee, such as "The user is not logged in." or "The user cannot respond at the present time because another user is currently in communication." When the absence process is executed, a chat is not performed.

Control unit 110 may identify a communicating user by way of data captured by camera unit 160. For example, control unit 110 may accept a login based on facial recognition technology in which a captured image is used. In this case, there is no necessity for a user to log in beforehand.

When the communicating user is the addressee at step SA3 (step SA3; YES), control unit 110 determines whether to respond to the incoming call by use of the captured image or the avatar image, based on an operation of the user (step SA4). At this time, the user decides whether s/he shall respond to the incoming call by way of captured data for a video chat or by way of an indicative avatar image, and performs an operation accordingly. For example, when communication device 100 displays the incoming call screen shown in FIG. 3, the user selects either button B12 or B13.

Although not shown in FIG. 5, the user can refuse to respond to a personally addressed incoming call. In this case, control unit 110 terminates the process without executing step SA5 and SA6. For example, when communication device 100 displays the incoming call screen shown in FIG. 3, the user can refuse to respond to the incoming call by selecting button B11.

When the user responds to the incoming call by use of a captured image (step SA4; NO), control unit 110 transmits image capture data to communication device 100 of the caller (step SA7). At communication device 100 of the caller, image capture data corresponding to the transmitted captured data is used as an image indicative of the other party of the chat. Control unit 110 may execute a predetermined image processing (such as cropping, color correction, or data-compression) on the captured image before transmitting the image capture data.

On the other hand, when a user responds to an incoming call by using the avatar image (step SA4; YES), control unit 110 determines the avatar image to be used for the chat (step SA5). In the present exemplary embodiment, control unit 110 determines an avatar image by recognizing the user based on the captured data and identifying the avatar image indicative of the recognized user. Control unit 110 may recognize the user before or after a receipt of an incoming call. For example, control unit 110 may recognize the user at a time of login.

After determining the avatar image, control unit 110 transmits avatar data for the determined avatar image to the corresponding communication device 100 (step SA6). In this case, communication device 100 of the caller uses the avatar image as an image indicative of the other party of the chat.

As described above, according to the present exemplary embodiment, the user can perform a chat by using either the captured image or the avatar image selectively. In the present exemplary embodiment, the avatar image is determined by communication device 100 based on the captured image. Therefore, the user is not required to specify his/her own avatar image in advance, and thus the user is able to perform a chat with ease by using an avatar image.

In addition, according to the present exemplary embodiment, a user can decide whether to use either a captured image or an avatar image, and then use these images selectively as desired. As a result, the user can avoid refusing chat communication for a negative reason only, such as "s/he would not want others to be seen now"; or "s/he would not want others to be known where s/he is." Therefore, according to the present exemplary embodiment, it is possible to reduce a disincentive for communication and thereby facilitate communication between users.

2. Modifications

The above exemplary embodiment is an example of an embodiment of the present technique. The present technique may be implemented in embodiments shown by the following modifications, other than the above exemplary embodiment. The following modifications may be combined with each other.

(Modification 1)

Communication device 100 can display both the captured image and the avatar image on the other communication device 100. In this case, communication device 100 transmits the captured data and the avatar data to the other communication device 100.

(Modification 2)

A communication of the present technique may be performed by more than 3 users (parties). In this case, each communication device 100 displays either the captured image or the avatar image with respect to each party of the chat. For example, display device 100 can display the captured image with respect to one party, and the avatar image with respect to another party.

(Modification 3)

Communication device 100 may cause the user to select an image to be displayed (the captured image or the avatar image) on his/her communication device 100. For example, communication device 100 of the caller may display a screen for receiving a selection of data to be transmitted from communication device 100 of the addressee at the time of calling. Hereinafter, as a matter of convenience, communication device 100 of the caller will be referred to as "communication device 100A" and communication device 100 of the addressee will be referred to as "communication device 100B."

Figure 6:
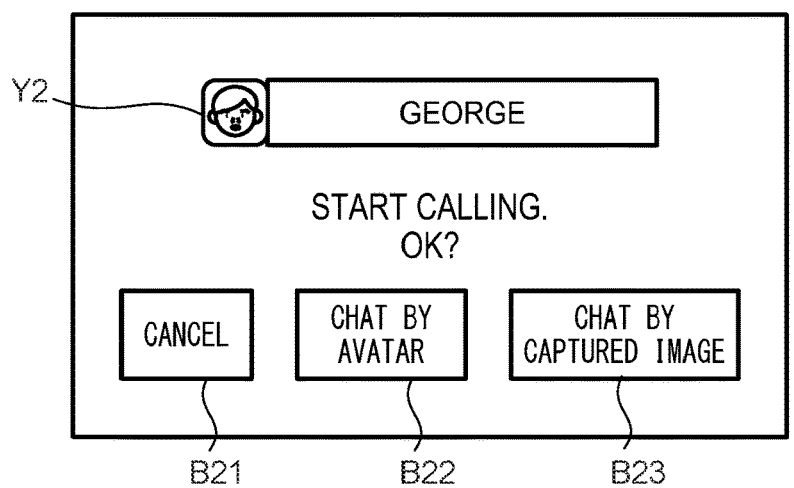
FIG. 6 shows an example of a selecting screen.

FIG. 6 shows an example of a selection screen. The selection screen includes image Y2 indicative of the addressee (namely, the other party of the chat), and buttons B21, B22, and B23 for receiving operations of the user. Image Y2 is an image similar to image Y1 shown in FIG. 3. Button B21 is a button for canceling a call. On the other hand, button B22 is a button for requesting the other party to perform a chat using the avatar image. In addition, button B23 is a button for requesting the other party to perform a chat using the captured image. Communication device 100A transmits the communication request when either button B22 or B23 was selected. In this case, the communication request includes information indicative of the image requested by the user.

When receiving the communication request, communication device 100B allows the user to select whether to respond to the request or not. Contrary to the abovementioned exemplary embodiment, communication device 100B does not allow the user to select whether to respond to the request by using the captured image or the avatar image. However, if the user does not want to perform a chat using the captured image, communication device 100B may transmit the avatar data even though the chat by using the captured image is requested by the caller.

Similarly, communication device 100A may allow the user to select the image to be displayed on its own device (namely, the captured image or the avatar image indicative of the user of communication device 100B).

(Modification 4)

Communication device 100 may store plural items of avatar data with respect to each user and transmit one of the plural items of avatar data to communication device 100 of the other party. For example, communication device 100 may store plural items of avatar data which represent different facial expressions of the same person, such as a smiley face and an angry face. In this case, communication device 100 can analyze facial characteristics (facial expression) of the user based on the captured image and determine the avatar image corresponding to the analyzed facial expression. Communication device 100 may analyze the user's facial expression at specified time intervals during a chat, and change the avatar data to be transmitted in response to a change of the facial expression. Facial expressions can be analyzed by any one of well-known arts.

(Modification 5)

Communication device 100 may generate an avatar image indicative of the captured image. For example, communication device 100 can generate the avatar image by using plural parts with respect to each facial region, such as a facial contour, eyes, ears, a nose, and a mouth. Specifically, communication device 100 selects each part of a facial region corresponding to the user's face based on the captured image, and generates the avatar image by combining the selected parts. Consequently, there is no necessity to prepare avatar images of users beforehand.

In the case where the avatar image is composed of such parts, plural items of part data indicative of these parts may be stored in communication devices 100 of the caller and the addressee. In this case, communication device 100 of the addressee may transmit data indicative of IDs, display positions (coordinates), and display sizes (magnification percentages) of parts to communication device 100 of the caller, instead of the avatar data. Namely, data to be transmitted by communication device 100 may be data necessary for display of the avatar image (data for specifying appearance of the avatar image), not necessarily be data indicative of the avatar image itself.

(Modification 6)

Communication device 100 may store plural captured images with respect to each user, and associate the plural captured images with a single avatar image. The plural captured images herein, represents the same person, however, and differs from each other in characteristics of appearance, such as a hairstyle, a facial expression, a presence or absence of glasses, and a presence or absence of makeup. This enables the user to respond to an incoming call by using the same avatar image regardless of his/her appearance.

(Modification 7)

Communication device 100 may change an image to be displayed on a corresponding communication device 100 (the captured image or the avatar image) during the chat. For example, communication device 100 can change the image in response to an operation of the user.

In addition, when switching the image to be displayed on the corresponding communication device 100 from the captured image to an avatar image, communication device 100 may determine an avatar image based on the captured image which is captured before switching. For example, communication device 100 may determine an avatar image by using one of the captured images captured at the beginning of the chat to a point of switching. In this case, communication device 100 may select one avatar image out of plural prepared avatar image as described in Modification 4, or generate an repeatedly as described in Modification 5.

(Modification 8)

The character image of the present technique need not necessarily be similar to the actual user. For example, the character image of the present technique may be an image that represents a character of a user's favorite game or comic that is configured by the user. In addition, the character image of the present technique may represent a face of an animal indicative of the user. Moreover, the character image of the present technique need not necessarily be an image of a face, and may be an image of an upper body or an entire body.

(Modification 9)

Communication device 100 may determine the avatar image by using parts of the captured image other than the face of the user. For example, in a case where an avatar image represents an entire body of a user, communication device 100 may recognize a color of clothing of the user, and determine the color of the avatar's body according to the recognized color.

In addition, when the captured image includes a predetermined pattern such as a logo or a code, communication device 100 may execute a process in relation to the avatar image in accordance with the pattern. For example, in a case that the captured image includes a bar code, communication device 100 may change a user's face to a face of a character associated with the bar code.
(Modification 10)

When displaying either the captured image or the avatar image at communication device 100 of the other user, communication device 100 can determine the image to be displayed without any operation being required to be carried out by the user.

In certain games and social networking services (SNS), users may be distinguished as "friends" or otherwise. The term "friend" herein refers to a specific personal relationship established by agreement between users (or by one of the users). In the exemplary embodiment described above, users also can be distinguished as to whether they are "friends" or otherwise.

In such a case, communication device 100 determines whether the caller of the communication request (namely, the party of the chat) is a friend of the addressee, and executes a process according to the determined result. For example, if the caller is the friend of the addressee, communication device 100 may respond to the incoming call by using the captured image. On the other hand, if the caller is not the friend of the addressee, communication device 100 may respond to the incoming call by using the avatar image.

Moreover, if a so-called "address book" is stored in storage unit 120, communication device 100 may respond to the incoming call from the user registered in the address book by using the captured image, and respond to the incoming call from the user not registered in the address book by using the avatar image.
(Modification 11)

The image capture unit of the present technique is not limited to those which are integrated with communication device 100, such as camera unit 160. For example, the image capture unit of the present technique may be a video camera communicated with communication device 100 by wired or wireless communication.
(Modification 12)

When the login is performed by capturing the user's face, communication device 100 may determine (or generate) the avatar image based on the captured image acquired by the login. In such a case, communication device 100 can determine the avatar image before receiving the incoming call of the chat. Therefore, it is not necessary to execute step SA5 (see FIG. 5) after receiving the incoming call.
(Modification 13)

When the incoming call screen includes an image indicative of the caller as shown in FIG. 3, the present technique can be applied to the image. Namely, the present technique may provide an information-processing device which displays the incoming call screen including either the avatar image or the captured image selected by the caller.
(Modification 14)

The present technique can be realized by use of a single apparatus or by uses of multiple apparatuses co-operating with each other. These apparatuses may be connected to one another via or not via a certain network.

In addition, the present technique can provide not only a communication device (an information-processing device) or a communication system, but also a communication method realized by use of such a device or system. Moreover, the present technique can provide a program to realize the function of the device. The program may be provided to an information-processing device in the form of a storage medium such as an optical disk or a semiconductor memory. Alternatively, the program may be downloaded to an information-processing device via a network such as the Internet.

What is claimed is:

1. An information-processing device, comprising:
   memory; and
   at least one processor configured to:
   acquire a first captured image of a first user utilizing the information-processing device, the first captured image being captured by an image capture unit;
   determine a first character image corresponding to the acquired first captured image;
   during communication between the first user and a second user utilizing another information-processing device, cause the other information-processing device to display at least one of the first captured image and the first character image, and cause the information-processing device to display at least one of a second captured image and a second character image corresponding to the second captured image, the second captured image and the second character image corresponding to the second user;
   determine whether the second user is included in an address book;
   in response to the determination that the second user is included in the address book stored in the information-processing device, select to transmit the first captured image to the other information-processing device, thereby causing the first captured image to be displayed on the other information-processing device, and
   in response to the determination that the second user is not included in the address book, select to transmit the first character image to the other information-processing device, thereby causing the first character image to be displayed on the other information-processing device, wherein:
   during the communication, the first captured image displayed on the other information-processing device is able to be switched to the first character image, or the first character image displayed on the other information-processing device is able to be switched to the first captured image; and upon detecting that the first captured image displayed on the other information-processing device needs to be switched to the first character image, the processor is further configured to determine the first character image based on the first captured image captured prior to switching from the first captured image to the first character image,
   wherein the processor is further configured to request the image capture unit to capture the first captured image, the request being triggered by receipt of an incoming call from the other information-processing device, and
   wherein the information-processing device is able to be shared by a plurality of users including the first user;
   the communication is addressed to one of the plurality of users; and
   the processor is further configured to identify the first user based on the first captured image and respond to the incoming call by executing different processes depending on whether the communication is addressed to the first user.

2. The information-processing device according to claim 1, wherein the communication between the first user and the second user is real-time communication.

3. The information-processing device according to claim 1, wherein either the first captured image or the first character image is selected according to an operation of the first user or the second user, to cause the other information-processing device to display the selected image.

4. The information-processing device according to claim 3, wherein either the first captured image or the first character image is selected according to an operation of the first user.

5. The information-processing device according to claim 3, wherein the operation is performed at the start of the communication.

6. The information-processing device according to claim 1, wherein either the second captured image or the second character image is selected according to an operation of the first user, to cause the information-processing device to display the selected image.

7. The information-processing device according to claim 6, wherein the operation is performed at the start of the communication.

8. The information-processing device according to claim 1, wherein either the first captured image or the first character image is selected depending on whether the second user is a specified user or not, to cause the other information-processing device to display the selected image.

9. The information-processing device according to claim 1, wherein the first character image is determined based on facial characteristics of the first user.

10. The information-processing device according to claim 9, wherein the first character image is determined from among a plurality of pre-registered character images.

11. The information-processing device according to claim 9, wherein:
the first character image is determined from among a plurality of character images pre-registered for each of the plurality of users.

12. The information-processing device according to claim 9, wherein the first character image is generated based on the facial characteristics of the first user.

13. The information processing device according to claim 12, wherein:
the first character image is composed of a plurality of parts corresponding to a plurality of regions of a character; and
the first character image is determined by selecting each of the plurality of parts.

14. The information-processing device according to claim 1, wherein the processor is further configured to, during the communication between the first user and the second user, cause the information-processing device to display both the second captured image and the second character image.

15. The information-processing device according to claim 1, wherein the first character image is composed of a plurality of parts corresponding to a plurality of regions of a character, each of the plurality of parts is selected based on the first captured image, and the first character image is generated by combining the plurality of selected parts.

16. The information-processing device according to claim 1, wherein the image capture unit is a camera.

17. The information-processing device according to claim 1, further comprising:
a touchscreen configured to receive an user input for designating the first character image or the first captured image to be displayed on the other information-processing device.

18. A communication system, comprising a plurality of information-processing devices, each of the plurality of information-processing device comprising a processor configured to:

acquire a first captured image of a first user captured by an image capture unit;
determine a first character image corresponding to the acquired captured image;
transmit either first captured data indicative of the first captured image or first character data indicative of the first character image to a corresponding information-processing device used by a second user, and receive either second captured data indicative of a second captured image captured by the other information-processing device or second character data indicative of a second character image determined by the corresponding information-processing device;
display at least one of the second captured image and the second character image by use of the received data;
determine whether the second user is included in an address book stored in the information-processing device;
in response to the determination that the second user is included in the address book, select to transmit the first captured image to the other information-processing device, thereby causing the first captured image to be displayed on the other information-processing device, and
in response to the determination that the second user is not included in the address book, select to transmit the first character image to the other information-processing device, thereby causing the first character image to be displayed on the other information-processing device, wherein:
during communication between the first user and the second user, the first captured image displayed on the corresponding information-processing device is able to be switched to the first character image or the first character image displayed on the corresponding information-processing device is able to be switched to the first captured image; and
upon detecting that the first captured image displayed on the corresponding information-processing device needs to be switched to the first character image, the processor is further configured to determine the first character image based on the first captured image captured prior to switching from the first captured image to the first character image,
wherein the processor is further configured to request the image capture unit to capture the first captured image, the request being triggered by receipt of an incoming call from the corresponding information-processing device, and
wherein the information-processing device is able to be shared by a plurality of users including the first user;
the communication is addressed to one of the plurality of users; and
the processor is further configured to identify the first user based on the first captured image and respond to the incoming call by executing different processes depending on whether the communication is addressed to the first user.

19. The communication system according to claim 18, wherein the image capture unit is a camera.

20. The communication system according to claim 18, wherein each of the plurality of information-processing devices further comprises:
a touchscreen configured to receive an user input for designating the first character image or the first captured image to be displayed on the other information-processing device.

21. A communication system, comprising:
a processing system, including at least one processor, the processing system being configured to:
acquire a first captured image of a first user utilizing an information-processing device, the first captured image being captured by an image capture unit;
determine a first character image corresponding to the acquired first captured image;
during communication between the first user and a second user utilizing another information-processing device, cause the other information-processing device to display at least one of the first captured image and the first character image, and cause the information-processing device to display at least one of a second captured image and a second character image corresponding to the second captured image, the second captured image and the second character image corresponding to the second user;
determine whether the second user is included in a list of an address book stored in the information-processing device;
in response to the determination that the second user is included in the address book, select to transmit the first captured image to the other information-processing device, thereby causing the first captured image to be displayed on the other information-processing device, and
in response to the determination that the second user is not included in the address book, select to transmit the first character image to the other information-processing device, thereby causing the first character image to be displayed on the other information-processing device, wherein:
during the communication, the first captured image displayed on the other information-processing device is able to be switched to the first character image, or the first character image displayed on the other information-processing device is able to be switched to the first captured image; and
upon detecting that the first captured image displayed on the other information-processing device needs to be switched to the first character image, the first character image is determined based on the first captured image captured prior to switching from the first captured image to the first character image,
wherein the processing system is further configured to request the image capture unit to capture the first captured image, the request being triggered by receipt of an incoming call from the other information-processing device, and
wherein the information-processing device is able to be shared by a plurality of users including the first user;
the communication is addressed to one of the plurality of users; and
the processing system is further configured to identify the first user based on the first captured image and respond to the incoming call by executing different processes depending on whether the communication is addressed to the first user.

22. The communication system according to claim 21, wherein the image capture unit is a camera.

23. The communication system according to claim 21, further comprising:
a touchscreen configured to receive an user input for designating the first character image or the first captured image to be displayed on the other information-processing device.

24. A non-transitory storage medium storing a program causing an information-processing device to execute a process, the process comprising:
acquiring a first captured image of a first user utilizing the information-processing device, the first captured image being captured by an image capture unit;
determining a first character image corresponding to the acquired first captured image;
during communication between the first user and a second user utilizing another information-processing device, causing the other information-processing device to display at least one of the first captured image and the first character image, and causing the information-processing device to display at least one of a second captured image and a second character image corresponding to the second captured image, the second captured image and the second character image corresponding to the second user;
determining whether the second user is included in a list of an address book stored in the information-processing device; and
in response to the determination that the second user is included in the address book, selecting to transmit the first captured image to the other information-processing device, thereby causing the first captured image to be displayed on the other information-processing device, and
in response to the determination that the second user is not included in the address book, selecting to transmit the first character image to the other information-processing device, thereby causing the first character image to be displayed on the other information-processing device, wherein:
during the communication, the first captured image displayed on the other information-processing device is able to be switched to the first character image, or the first character image displayed on the other information-processing device is able to be switched to the first captured image; and
upon detecting that the first captured image displayed on the other information-processing device needs to be switched to the first character image, the first character image is determined based on the first captured image captured prior to switching from the first captured image to the first character image,
wherein the process further comprises requesting the image capture unit to capture the first captured image, the request being triggered by receipt of an incoming call from the other information-processing device, and
wherein the information-processing device is able to be shared by a plurality of users including the first user;
the communication is addressed to one of the plurality of users; and
the process further comprises identifying the first user based on the first captured image and responding to the incoming call by executing different processes depending on whether the communication is addressed to the first user.

25. A communication method, comprising:
capturing a first captured image of a first user and a second captured image of the second user;
determining a first character image corresponding to the first captured image and a second character image corresponding to the second captured image;
during communication between the first user utilizing a first information-processing device and a second user utilizing a second information-processing device, causing the first information-processing device to display at least one of the second captured image and the second character image, and causing the second information-processing device to display at least one of the first captured image and the first character image;

determining whether the second user is included in a list of an address book stored in the first information-processing device; and in response to the determination that the second user is included in the address book, selecting to transmit the first captured image to the second information-processing device, thereby causing the first captured image to be displayed on the second information-processing device, and in response to the determination that the second user is not included in the address book, selecting to transmit the first character image to the second information-processing device, thereby causing the first character image to be displayed on the second information-processing device, wherein:

during the communication, the first captured image displayed on the second information-processing device is able to be switched to the first character image or the first character image displayed on the second information-processing device is able to be switched to the first captured image; and upon detecting that the first captured image displayed on the second information-processing device needs to be switched to the first character image, the first character image is determined based on the first captured image captured prior to switching from the first captured image to the first character image, wherein the communication method further comprises requesting an image capture unit to capture the first captured image, the request being triggered by receipt of an incoming call from the second information-processing device, and wherein the first information-processing device is able to be shared by a plurality of users including the first user;

the communication is addressed to one of the plurality of users; and the communication method further comprises identifying the first user based on the first captured image and responding to the incoming call by executing different processes depending on whether the communication is addressed to the first user.

* * * * *